(12) United States Patent
Suzuki et al.

(10) Patent No.: US 11,558,447 B2
(45) Date of Patent: Jan. 17, 2023

(54) COMMUNICATION SYSTEM, NETWORK-SIDE APPARATUS, TRANSMISSION FUNCTION CHANGING METHOD AND PROGRAM

(71) Applicant: NIPPON TELEGRAPH AND TELEPHONE CORPORATION, Tokyo (JP)

(72) Inventors: Takahiro Suzuki, Musashino (JP); Sang-Yuep Kim, Musashino (JP); Yushi Koyasako, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/286,973

(22) PCT Filed: Oct. 3, 2019

(86) PCT No.: PCT/JP2019/039076
§ 371 (c)(1),
(2) Date: Apr. 20, 2021

(87) PCT Pub. No.: WO2020/085029
PCT Pub. Date: Apr. 30, 2020

(65) Prior Publication Data
US 2021/0392181 A1    Dec. 16, 2021

(30) Foreign Application Priority Data
Oct. 25, 2018   (JP) .............................. JP2018-201211

(51) Int. Cl.
*H04L 65/80*     (2022.01)
*H04L 1/00*      (2006.01)
*H04L 65/75*     (2022.01)

(52) U.S. Cl.
CPC ............ *H04L 65/80* (2013.01); *H04L 1/0041* (2013.01); *H04L 65/762* (2022.05)

(58) Field of Classification Search
CPC ..... H04L 65/80; H04L 65/602; H04L 1/0041; H04L 1/0009; H04L 1/00; H04L 29/08; H04L 65/762; H04L 65/40
See application file for complete search history.

(56) References Cited

U.S. PATENT DOCUMENTS

| | | | |
|---|---|---|---|
| 2004/0105463 A1* | 6/2004 | Cheung ............... | H04L 65/4084 370/468 |
| 2005/0018768 A1* | 1/2005 | Mabey ................. | H04L 65/611 375/240 |

(Continued)

FOREIGN PATENT DOCUMENTS

JP      2009296164 A    12/2009

OTHER PUBLICATIONS

Ming Su et al, QoE in video streaming over wireless networks: perspectives and research challenges, Aug. 25, 2015, Publisher: Springer Science+Business Media (Year: 2015).*

(Continued)

*Primary Examiner* — Javier O Guzman (57) ABSTRACT

A communication system includes a network-side apparatus and a user-side apparatus. The network-side apparatus includes a transmission function unit configured to perform processing of a transmission function on data received from the user-side apparatus, a quality calculation unit configured to calculate a quality of media data which is transmitted from the user-side apparatus and on which the processing is performed by the transmission function unit; and a transmission function changing unit configured to change the transmission function performed by the transmission func- (Continued)

tion unit in a range in which the calculated quality satisfies a quality required by an application.

9 Claims, 9 Drawing Sheets

(56) References Cited

U.S. PATENT DOCUMENTS

| | | | |
|---|---|---|---|
| 2008/0177893 A1* | 7/2008 | Bowra | H04L 65/80 709/231 |
| 2008/0256272 A1* | 10/2008 | Kampmann | H04L 47/2433 710/57 |
| 2009/0300455 A1* | 12/2009 | Nakagawa | H04L 1/0042 714/748 |
| 2009/0300687 A1* | 12/2009 | Quigley | H04L 65/80 725/62 |
| 2010/0296428 A1* | 11/2010 | Ho | H04H 20/42 370/312 |
| 2013/0174203 A1* | 7/2013 | Ozawa | H04N 21/2343 725/62 |
| 2013/0297743 A1* | 11/2013 | Eschet | H04L 65/756 709/219 |
| 2014/0201382 A1* | 7/2014 | Shivadas | H04L 65/80 709/231 |
| 2015/0023404 A1* | 1/2015 | Li | H04L 65/612 375/240.02 |
| 2015/0103785 A1* | 4/2015 | Jung | H04W 72/087 370/329 |
| 2016/0088054 A1* | 3/2016 | Hassan | H04N 21/8456 709/219 |
| 2018/0020036 A1* | 1/2018 | Ramamurthy | H04N 21/23418 |
| 2018/0213243 A1* | 7/2018 | Liu | H04N 19/146 |

OTHER PUBLICATIONS

Raj et al., Adaptive video streaming over HTTP through 4G wireless networks based on buffer analysis, Jun. 20, 2017, EURASIP Journal on Image and Video Processing. (Year: 2017).*

Ministry of Internal Affairs and Communications, Section 3 Information and Communication Industry with IoT, 2017 White Paper on Information and Communication, 2017, pp. 125-142.

Takahiro Suzuki et al., Demonstration of 10-Gbps Real-Time Reed-Solomon Decoding Using GPU Direct Transfer and Kernel Scheduling for Flexible Access Systems, Journal of Lightwave Technology, vol. 36, No. 10, 2018, pp. 1875-1881.

Airi Sakaushi et al., Image Enhancement and Rate Adaptation for High-quality and Network-friendly Video Surveillance System, IEICE Technical Report, vol. 2017-AVM-99, No. 23, 2017, pp. 123-128.

Takahiro Suzuki et al., Software Implementation of PON Physical-Layer Processing for Fully Software-Defined Optical Access Systems, 2018 European Conference on Optical Communication (ECOC), Sep. 2018.

* cited by examiner

COMMUNICATION SYSTEM, NETWORK-SIDE APPARATUS, TRANSMISSION FUNCTION CHANGING METHOD AND PROGRAM

CROSS-REFERENCE TO RELATED APPLICATIONS

This application is a 371 U.S. National Phase of International Application No. PCT/JP2019/039076 filed on Oct. 3, 2019, which claims priority to Japanese Application No. 2018-201211 filed on Oct. 25, 2018. The entire disclosures of the above applications are incorporated herein by reference.

TECHNICAL FIELD

The present invention relates to a communication system, a network-side apparatus, a transmission function changing method, and a program.

BACKGROUND ART

In recent years, there have been many efforts to provide new services through networks (hereinafter also described as "NWs") with the spread of Internet-of-Things (IoT) apparatuses (see, e.g., Non Patent Literature 1). Although examples of such services are conventionally limited to aggregation and analysis of sensor information, a system has been devised in which media information, such as images and sounds, is sent from an IoT apparatus to a NW to analyze the information on the NW and feedback is given to the IoT apparatus, as in automated driving and robot control. In addition, applications (also described hereinafter as "apps") that need to give feedback to such IoT apparatuses are required to be low-latency. As such, a system is required to provide a service through edge computing of causing an application to run at an edge, such as an access station located close to IoT apparatuses, rather than providing a service on a conventional cloud.

The advantage of low latency is obtained by placing a server executing such an app in an access station. On the other hand, unlike cloud computing in which servers for executing apps are aggregated in a data center, edge computing is expected to entail increasing equipment costs because communication apparatuses such as an optical line terminal (OLT) and a media converter and servers are deployed in access stations of respective regions. To deal with this problem, a method of achieving edge computing with only a simple server is expected.

The communication apparatuses perform transmission functions (frame synchronization, error correction, and line coding). These functions are involved with a frame reception rate and an error rate of a received signal.
In recent years, software for transmission functions has been implemented (see, e.g., Non Patent Literature 2). As an algorithm requiring a greater amount of computation is used, a higher frame reception rate and a lower error rate can be obtained. However, in communication standards, algorithms requiring a great amount of computation are used to guarantee a high transmission quality.

Image processing is conceivable as an example of an app for edge computing, and images can be processed even with noise incorporated therein. A quality of images is evaluated using a peak signal-to-noise ratio (PSNR). A PSNR of about 30 dB is a standard value in image compression, which is considered to be a level of image degradation which does not cause a problem in image processing.
A PSNR is defined as follows:

[Math. 1]

$$PSNR = 10 \cdot \log_{10}\left(\frac{MAX^2}{MSE}\right) \quad (1)$$

[Math. 2]

$$MSE = \frac{1}{mn}\sum_{i=0}^{m-1}\sum_{j=0}^{n-1}[I(i,j) - K(i,j)]^2 \quad (2)$$

MAX represents a maximum pixel value. m denotes an image size in the vertical direction and n denotes an image size in the horizontal direction. I(i, j) denotes an original image, and K(i, j) denotes an image obtained by imparting noise to the original image. The original image is essential for evaluating a PSNR of the noise-imparted image data.

Meanwhile, there are methods of removing noise in image processing. For example, a median filter is a famous technique. The median filter is a method of removing noise by taking the median from a pixel of interest and neighboring pixels in an image. Image filtering utilizes the correlation of the neighboring pixels of an image, and thus requires simple computation, allowing the amount of computation thereof to be less than that of error correction processing that requires complex arithmetic operations.

CITATION LIST

Non Patent Literature

Non Patent Literature 1: Ministry of Internal Affairs and Communications, "Section 3: Development of IoT in the Information and Communications Industry," 2017 White Paper on Information and Communications in Japan, 2017, pp. 125 to 142
Non Patent Literature 2: Takahiro Suzuki, Sang-Yuep Kim, Jun-ichi Kani, Toshihiro Hanawa, Ken-Ichi Suzuki, Akihiro Otaka, "Demonstration of 10-Gbps Real-Time Reed-Solomon Decoding Using GPU Direct Transfer and Kernel Scheduling for Flexible Access Systems Demonstration of 10-Gbps Real-Time Reed-Solomon Decoding Using GPU Direct Transfer and Kernel Scheduling for Flexible Access Systems," Journal of Lightwave Technology, May 2018, Vol. 36, No. 10, pp. 1875 to 1881

SUMMARY OF THE INVENTION

Technical Problem

Figure 11:
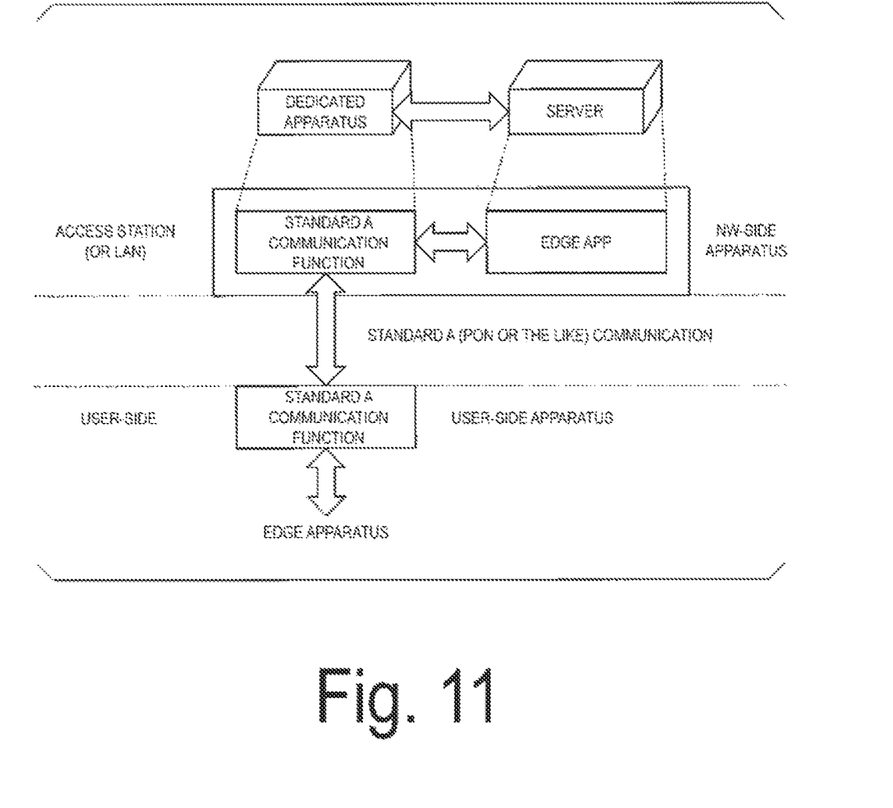
FIG. 11 is a configuration diagram of edge computing using a conventional technology.

A conceivable configuration of edge computing in optical access is illustrated in FIG. 11. In edge computing, a server is deployed in a communication (access) station. Thus, an edge apparatus and the communication station need to perform transmission according to a standard for a passive optical network (PON) or the like, and thus a dedicated apparatus that satisfies the standard is necessary. Edge computing is performed on the server connected to the dedicated apparatus. Thus, there is a problem in that a dedicated apparatus satisfying the standard is necessary in each access station for each user of edge computing who want to use the service, which leads to an increase in facility costs.

In light of the above circumstances, an objective of the present invention is to provide a communication system, a network-side apparatus, a transmission function changing method, and a program capable of implementing network-side transmission functions without using a dedicated apparatus.

Means for Solving the Problem

An aspect of the present invention is a communication system in which the network-side apparatus includes a transmission function unit configured to perform processing of a transmission function on data received from the user-side apparatus, a quality calculation unit configured to calculate a quality of media data which is transmitted from the user-side apparatus and on which the processing is performed by the transmission function unit, and a transmission function changing unit configured to change the transmission function performed by the transmission function unit in a range in which the quality calculated by the quality calculation unit satisfies a quality required by an application.

An aspect of the present invention is the above-described communication system in which, the network-side apparatus repeats processing of causing the transmission function unit to perform the processing of the transmission function on the media data received from the user-side apparatus, causing the quality calculation unit to calculate the quality of the media data, and causing the transmission function changing unit to reduce the transmission function in the range in which the quality calculated by the quality calculation unit satisfies the quality required by the application, and the transmission function changing unit notifies the network-side apparatus of completion of a change in the transmission function when the change of reducing the transmission function is finished.

An aspect of the present invention is the above-described communication system in which the network-side apparatus further includes a quality improvement processing unit configured to perform quality improvement processing of improving a quality of the data on which the processing of the transmission function is performed by the transmission function unit, and the quality calculation unit is configured to calculate the quality of the media data on which the processing of the transmission function is performed by the transmission function unit and on which the quality improvement processing is performed by the quality improvement processing unit.

An aspect of the present invention is the above-described communication system in which the transmission function changing unit changes one or more of a frame search ratio, a degree of redundancy of error correction, or a line coding method.

An aspect of the present invention is the above-described communication system in which the transmission function changing unit does not change a function of the error correction for a header of a frame received from the user-side apparatus, and changes a function of the error correction for a payload part of the frame.

An aspect of the present invention is a network-side apparatus including a transmission function unit configured to perform processing of a transmission function on data received from a user-side apparatus, a quality calculation unit configured to calculate a quality of media data which is transmitted from the user-side apparatus and on which the processing is performed by the transmission function unit, and a transmission function changing unit configured to change the transmission function performed by the transmission function unit in a range in which the quality calculated by the quality calculation unit satisfies a quality required by an application.

An aspect of the present invention is a transmission function changing method including performing processing of a transmission function on data received from a user-side apparatus, calculating a quality of media data which is transmitted from the user-side apparatus and on which the processing is performed in the performing, and changing the transmission function performed in the performing in a range in which the quality calculated in the calculating satisfies a quality required by an application.

An aspect of the present invention is a program for causing a computer to operate as the above-described network-side apparatus.

Effects of the Invention

According to the present invention, it is possible to implement network-side transmission functions without using a dedicated apparatus.

DESCRIPTION OF EMBODIMENTS

Hereinafter, embodiments of the present invention will be described in detail with reference to the drawings.

In the present embodiment, the amount of computation required for communication is reduced by performing communication with minimum or near-minimum transmission functions satisfying requirements of an app. Thus, an NW-side apparatus installed in an access station can be configured only by a server. Specifically, the NW-side apparatus reduces transmission functions as follows.

(1) The NW-side apparatus minimizes transmission functions (primarily, physical layer functions such as frame synchronization, error correction, and line coding) in a range in which a PSNR that is an evaluation indicator for image quality is higher than a reference value. In frame synchronization, the ratio of the number of bits on which processing of searching for the beginning of a frame is performed to the number of bits of consecutive input signals is assumed to be a frame search ratio R, R is set to be low. As a result, although the number of frame detection errors increases, the amount of computation can be reduced. For error correction, the amount of computation decreases by reducing a degree of redundancy in a method. For line coding, a method with a low amount of computation is used. Note that a plurality of methods exist for line coding with a low amount of computation. For example, the amount of computation of 8b/10b coding is lower than that of 64b/66b coding.

(2) Noise is removed in image filtering with a low amount of computation, and then the NW-side apparatus minimizes the transmission functions (frame synchronization, error correction, and line coding) in a range in which a PSNR is higher than the reference value.

In this way, edge computing can be achieved without using an NW-side dedicated apparatus that conforms to standards. Furthermore, communication processing can be performed with a low amount of resources.

Detailed Embodiments Will be Described Below

First Embodiment

Figure 1:
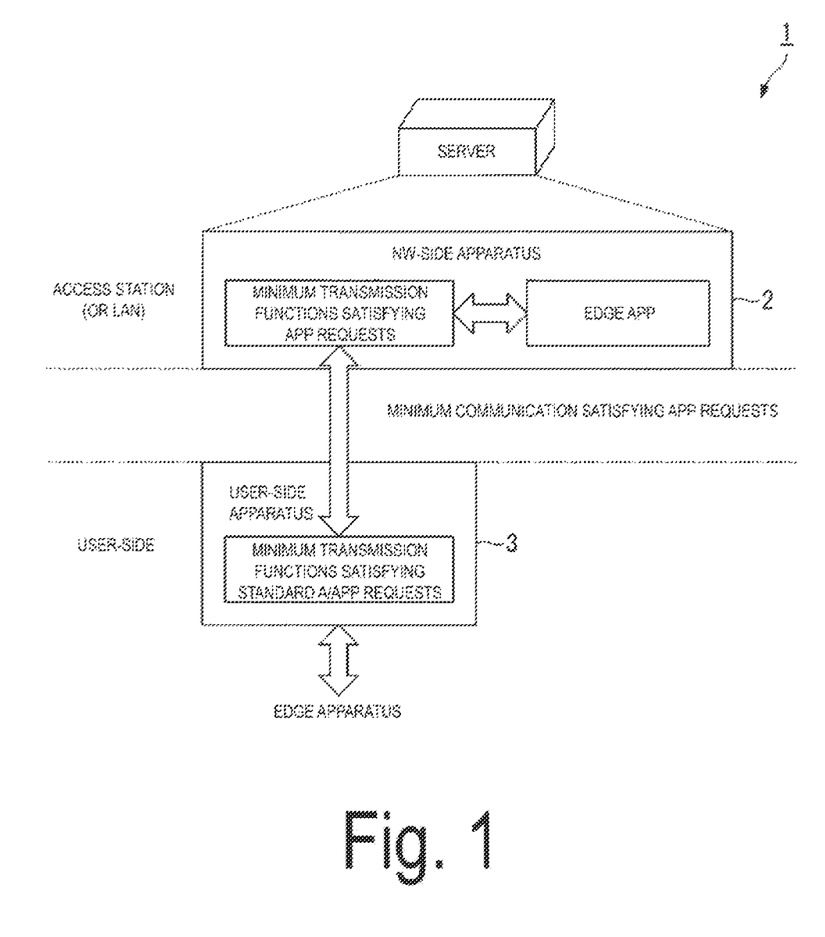
FIG. 1 is a configuration diagram of an edge computing system according to a first embodiment.

FIG. 1 is a configuration diagram of an edge computing system 1 according to the present embodiment. In the edge computing system 1 illustrated in the drawing, an NW-side apparatus 2 which is installed in an access station is configured with a server by minimizing transmission functions, and an application runs on the server. The application is, for example, an edge app for providing a service to a user. Communication functions of the NW-side apparatus 2 are minimized to minimum transmission functions satisfying application requirements for the edge app. The NW-side apparatus 2 is connected to one or more user-side apparatuses 3. Note that the NW-side apparatus 2 may be connected to the one or more user-side apparatuses 3 through a LAN.

Figure 2:
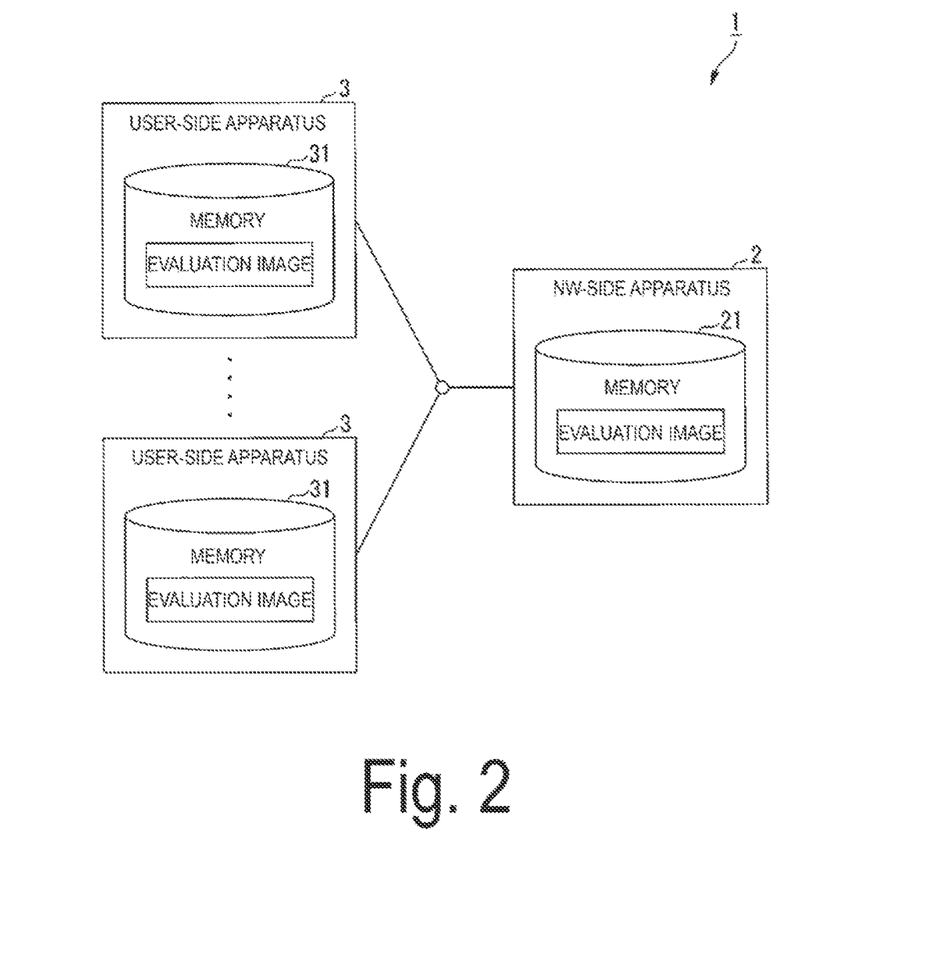
FIG. 2 is a diagram illustrating a configuration example of a connection between an NW-side apparatus and a user-side apparatus according to the embodiment.

FIG. 2 is a diagram illustrating a configuration example of a connection between the NW-side apparatus 2 and the user-side apparatuses 3. A configuration in which the plurality of user-side apparatuses 3 are connected to the NW-side apparatus 2, as in a PON configuration, or a configuration in which the one NW-side apparatus 2 and the one user-side apparatus 3 are connected, as in a single star (SS) configuration, is assumed. A memory 21 of the NW-side apparatus 2 and memories 31 of the user-side apparatuses 3 store common evaluation images for evaluating PSNRs.

Figure 3:
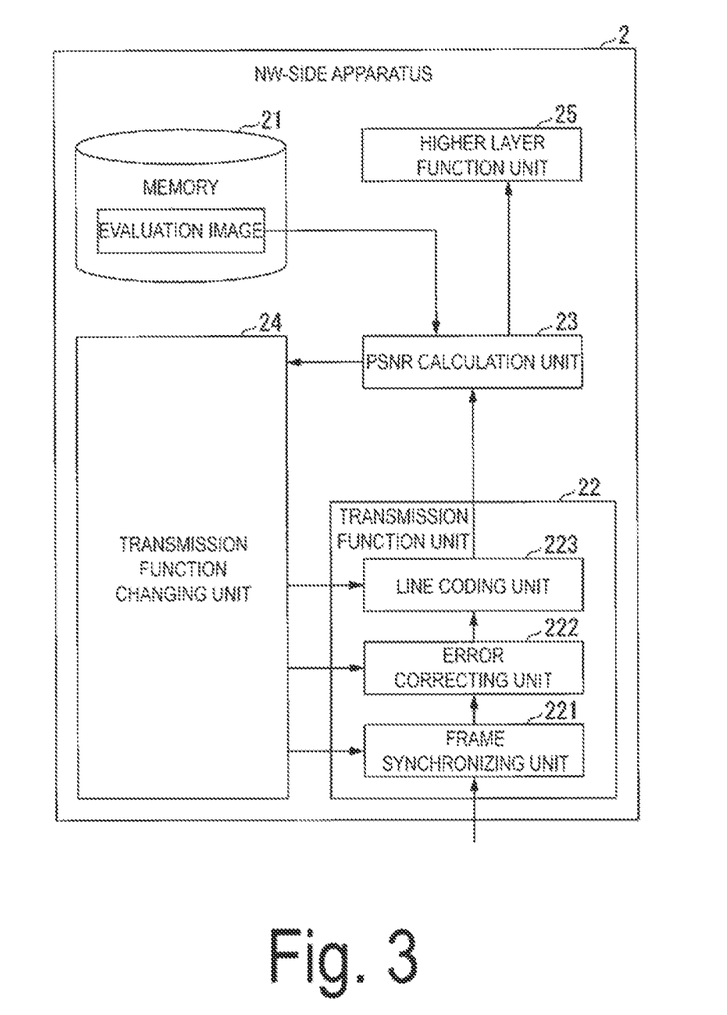
FIG. 3 is a block diagram illustrating a configuration of the NW-side apparatus according to the embodiment.

FIG. 3 is a block diagram illustrating a configuration of the NW-side apparatus 2. The NW-side apparatus 2 includes the memory 21, a transmission function unit 22, a PSNR calculation unit 23, a transmission function changing unit 24, and a higher layer function unit 25. The memory 21 is an example of a storage unit, and stores the evaluation image. The transmission function unit 22 performs processing of transmission functions on data received from the user-side apparatuses 3. The transmission function unit 22 includes a frame synchronizing unit 221, an error correcting unit 222, and a line coding unit 223. The frame synchronizing unit 221 performs frame synchronization on the received data. The error correcting unit 222 performs error correction processing on the received data. The line coding unit 223 performs line coding on the received data.

The PSNR calculation unit 23 calculates a PSNR according to Equations (1) and (2) using the evaluation image (original image) stored in the memory 21 and image data (image obtained by imparting noise to the original image) obtained by causing the transmission function unit 22 to perform processing of the transmission functions on the evaluation image transmitted from the user-side apparatus 3. The transmission function changing unit 24 changes the transmission functions executed by the transmission function unit 22 based on the PSNR calculated by the PSNR calculation unit 23. The higher layer function unit 25 performs functions of the higher layer. The functions of the higher layer include a function of executing the edge app.

Figure 4:
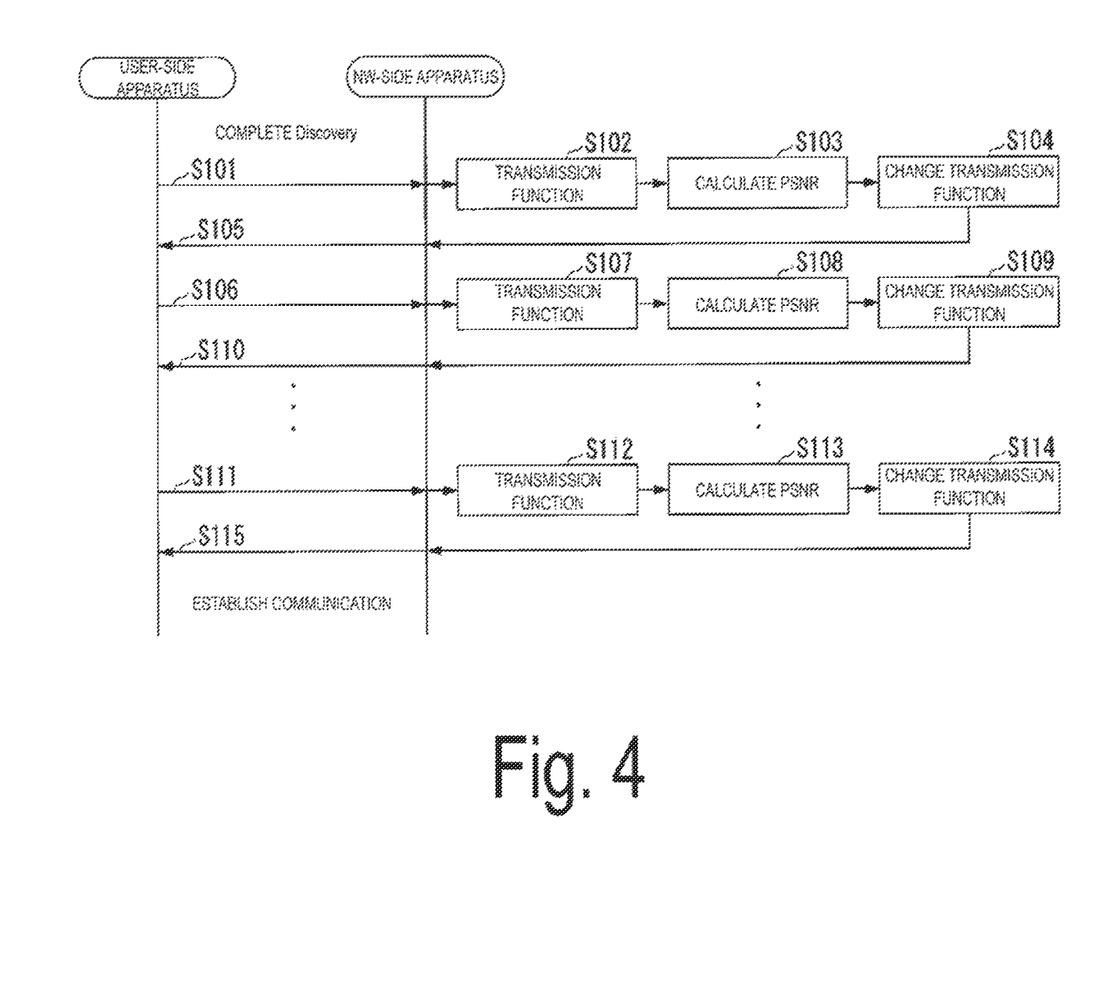
FIG. 4 is a sequence diagram of the edge computing system according to the embodiment.

FIG. 4 is a sequence diagram of the edge computing system 1. In this sequence, the NW-side apparatus 2 minimizes the transmission functions. First, the NW-side apparatus 2 completes discovery of the user-side apparatus 3 connected to NW-side the apparatus 2, and then the user-side apparatus 3 transmits a signal in which an evaluation image is set to the NW-side apparatus 2 (step S101). Note that the discovery is completed by performing communication several times according to communication standards or only with functions with reduced performance.

The transmission function unit 22 of the NW-side apparatus 2 performs processing of a transmission function on the signal received from the user-side apparatus 3 (step S102), and the PSNR calculation unit 23 calculates a PSNR of the evaluation image on which the processing of the transmission function has been performed (step S103). The transmission function changing unit 24 changes the transmission function of the transmission function unit 22 based on the calculated PSNR (step S104). In response to the change in the transmission function of the transmission function unit 22, the transmission function changing unit 24 instructs the user-side apparatus 3 to change the transmission function (step S105). Note that, if there is no need for the user-side apparatus 3 to change the transmission function, the instruction can be omitted.

The edge computing system 1 repeats the same processes as steps S101 to S105 (steps S106 to S110, and steps S111 to S114). With this repetition, the NW-side apparatus 2 changes each transmission function and calculates the PSNR after the change, and minimizes each transmission function (using an algorithm requiring a small amount of computation) in a range in which the PSNR satisfies the reference value $T_{SNR}$. When the transmission function changing unit 24 finishes changing the transmission functions of the transmission function unit 22, the transmission function changing unit 24 notifies the user-side apparatus 3 of the completion of the change in the transmission functions (step S115). In a case in which there is a need for the user-side apparatus 3 to change the transmission functions due to the change in the transmission functions in step S114, a changed transmission function may be set in the notification of the completion of the change in the transmission functions. This allows the NW-side apparatus 2 to establish communication with the user-side apparatus 3. After the completion of the change in the transmission functions, the PSNR calculation unit 23 outputs, to the higher layer function unit 25, data on which the transmission function unit 22 has performed the processing of the transmission functions without calculating the PSNR.

Figure 5:
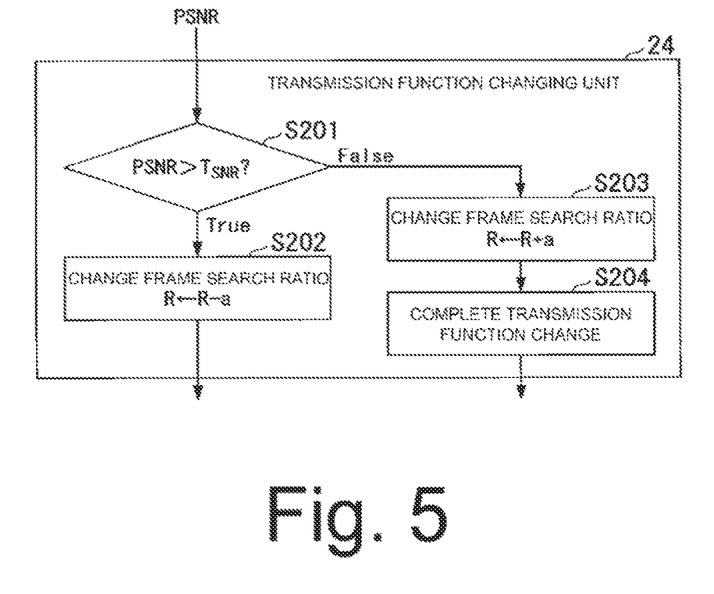
FIG. 5 is a diagram illustrating a transmission function changing method for a frame synchronization function of the NW-side apparatus according to the embodiment.

FIG. 5 is a diagram illustrating a transmission function changing method for a frame synchronization function of the NW-side apparatus 2.

As an example, the transmission function changing unit 24 lowers a frame search ratio within a range in which the PSNR is greater than the reference value $T_{SNR}$. In other words, if it is determined that the PSNR calculated by the PSNR calculation unit 23 is greater than the reference value $T_{SNR}$ (step S201: True), the transmission function changing unit 24 lowers the frame search ratio R to a value obtained by subtracting a predetermined value a from the current frame search ratio R (step S202). The transmission function changing unit 24 outputs the updated frame search ratio R to the frame synchronizing unit 221. The frame synchronizing unit 221 performs frame synchronization processing using the updated frame search ratio R.

In addition, each time an evaluation image is received from the user-side apparatus 3, the transmission function changing unit 24 repeats the processing from step S201, and if it is determined that the PSNR calculated by the PSNR calculation unit 23 is equal to or lower than the reference value $T_{SNR}$ (step S201: False), the transmission function changing unit 24 updates the frame search ratio R to a value obtained by adding the predetermined value a to the current frame search ratio R (step S203). This allows the transmission function changing unit 24 to restore the value of the frame search ratio R to the value when the PSNR exceeds the reference value $T_{SNR}$. The transmission function changing unit 24 outputs the updated frame search ratio R to the frame synchronizing unit 221. The frame synchronizing unit 221 performs frame synchronization processing using the updated frame search ratio R. The transmission function changing unit 24 completes the change in the transmission function for the frame synchronization function (step S204). In other words, the transmission function changing unit 24 further notifies the user-side apparatus 3 of the change in the transmission function to change another transmission function, or notifies the user-side apparatus 3 of the completion of the change in the transmission functions.

Figure 6:
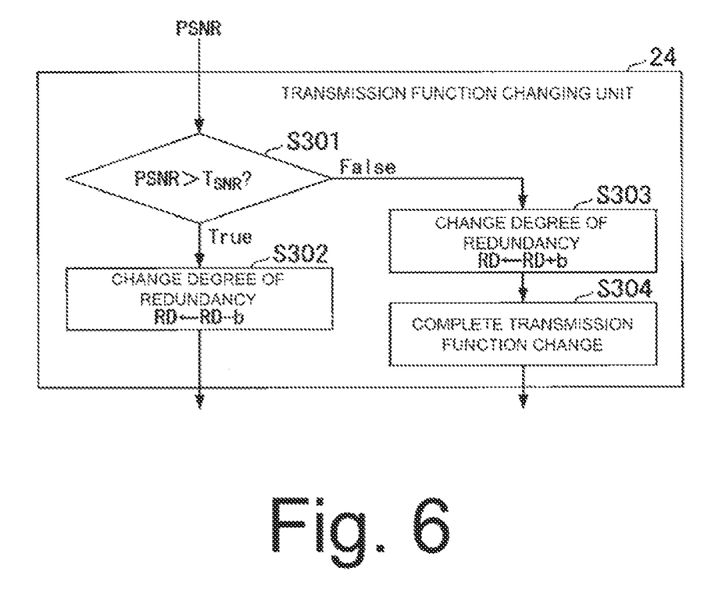
FIG. 6 is a diagram illustrating the transmission function changing method of for a decoding method for error correction of the NW-side apparatus according to the embodiment.

FIG. 6 is a diagram illustrating a transmission function changing method for a decoding method for error correction of the NW-side apparatus 2. As an example, the transmission function changing unit 24 reduces a degree of redundancy within a range in which a PSNR is greater than the reference value $T_{SNR}$. In other words, if it is determined that the PSNR calculated by the PSNR calculation unit 23 is greater than the reference value $T_{SNR}$ (step S301: True), the transmission function changing unit 24 reduces a degree of redundancy RD to a value obtained by subtracting a predetermined value b from the current degree of redundancy RD (step S302). The degree of redundancy RD indicates the number of redundancies of error correction. The transmission function changing unit 24 outputs the updated degree of redundancy RD to the error correcting unit 222. The error correcting unit 222 performs error correction processing using the updated degree of redundancy RD. Furthermore, the transmission function changing unit 24 transmits, to the user-side apparatus 3, a transmission function change instruction in which the updated degree of redundancy RD is set. The user-side apparatus 3 changes the transmission function according to the transmission function change instruction.

In addition, each time an evaluation image is received from the user-side apparatus 3, the transmission function changing unit 24 repeats the processing from step S201, and if it is determined that the PSNR calculated by the PSNR calculation unit 23 is equal to or lower than the reference value $T_{SNR}$ (step S301: False), the transmission function changing unit 24 updates the degree of redundancy RD to a value obtained by adding the predetermined value b to the current degree of redundancy RD (step S303). This allows the transmission function changing unit 24 to restore the value of the degree of the redundancy RD to the value when the PSNR exceeds the reference value $T_{SNR}$. The transmission function changing unit 24 outputs the updated degree of redundancy RD to the error correcting unit 222. The error correcting unit 222 performs error correction processing using the updated degree of redundancy RD. The transmission function changing unit 24 completes the change in the transmission function for the decoding method for error correction (step S304). In other words, the transmission function changing unit 24 further notifies the user-side apparatus 3 of the change in the transmission function to change another transmission function, or notifies the user-side apparatus 3 of the completion of the change in the transmission functions. The degree of redundancy RD updated in step S303 is set in this notification. The user-side apparatus 3 changes the transmission function according to the transmission function change instruction.

Figure 7:
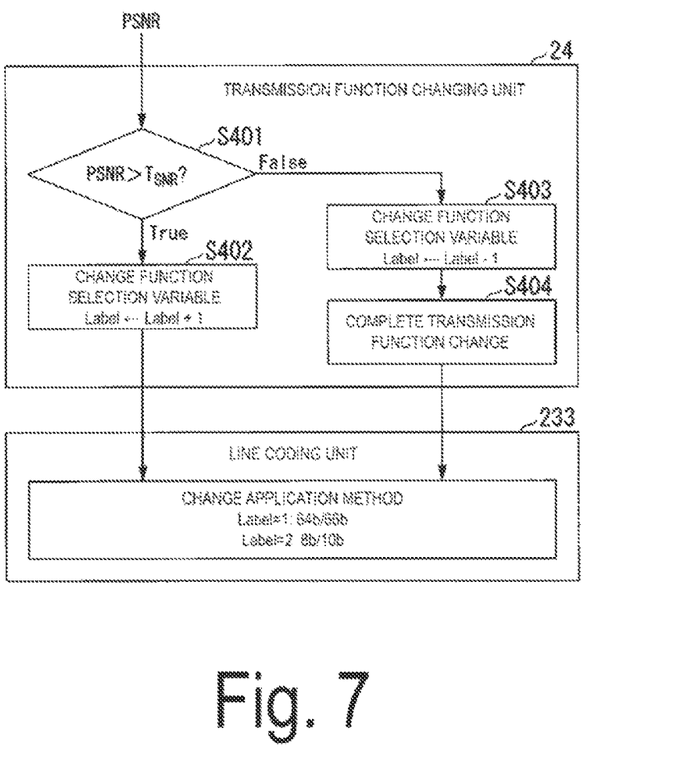
FIG. 7 is a diagram illustrating the transmission function changing method for a decoding method for line coding of the NW-side apparatus according to the embodiment.

FIG. 7 is a diagram illustrating a transmission function changing method for a decoding method for line coding of the NW-side apparatus 2. As one example, the transmission function changing unit 24 uses a line coding method in which there is little band loss (fewer additional bits) within a range in which a PSNR is greater than the reference value $T_{SNR}$. In the present embodiment, the line coding unit 223 performs 64b/66b coding when a Label is equal to 1, and performs 8b/10b coding when the Label is equal to 2.

If it is determined that the PSNR calculated by the PSNR calculation unit 23 is greater than the reference value $T_{SNR}$ (step S401: True), the transmission function changing unit 24 updates the value of the Label to a value obtained by adding one to the current value of the Label (step S402). The transmission function changing unit 24 outputs the updated Label to the line coding unit 223.

The line coding unit 223 performs demodulation using line coding in accordance with the updated value of the Label. In addition, the transmission function changing unit 24 transmits, to the user-side apparatus 3, a transmission function change instruction in which the updated value of the Label or information representing the line coding method corresponding to the value is set. The user-side apparatus 3 changes the transmission function according to the transmission function change instruction.

In addition, each time an evaluation image is received from the user-side apparatus 3, the transmission function changing unit 24 repeats the processing from step S201, and if it is determined that the PSNR calculated by the PSNR calculation unit 23 is equal to or lower than the reference value $T_{SNR}$ (step S401: False), the transmission function changing unit 24 updates the value of the Label to a value obtained by subtracting one from the current value of the Label (step S403). The transmission function changing unit 24 notifies the line coding unit 223 of the updated value of the Label and returns to the line coding method when the PSNR exceeded the reference value $T_{SNR}$. The line coding unit 223 performs demodulation using line coding in accordance with the updated value of the Label. The transmission function changing unit 24 completes the transmission function change for the decoding method for the line coding (step S404). In other words, the transmission function changing unit 24 further notifies the user-side apparatus 3 of the change in the transmission function to change another transmission function, or notifies the user-side apparatus 3 of the completion of the change in the transmission functions. Information representing the value of the Label updated in step S403 or the line coding method corresponding to this value is set in this notification. The user-side apparatus 3 changes the transmission function according to the transmission function change instruction.

Figure 8:
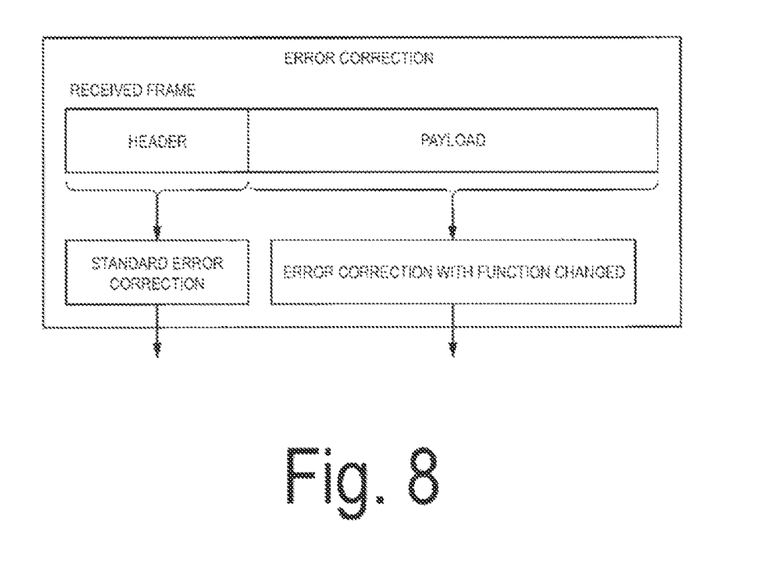
FIG. 8 is a diagram illustrating an error correction method according to the embodiment.

FIG. 8 is a diagram illustrating a method for error correction performed by the error correcting unit 222. The header of a received frame represents control information. Thus, the header part of the received frame is subject to standard error correction with a high error correction capability. The payload part of the received frame represents image information used in an image application or the like. The error correcting unit 222 performs the error correction, the function of which has been changed by the transmission function changing unit 24, on the payload part. The function change of the error correction method is performed in the method illustrated in FIG. 6 described above.

The edge computing system according to the present embodiment can reduce the amount of computation required for the transmission functions of the NW-side apparatus by performing communication with minimum or near-minimum transmission functions satisfying requirements for an edge app.

Second Embodiment

The NW-side apparatus according to the present embodiment removes noise in image data on which processing of the transmission functions has been performed. The transmission functions can be minimized by using an image filter requiring a low amount of computation for removing noise. Hereinafter, differences from the first embodiment will be described.

Figure 9:
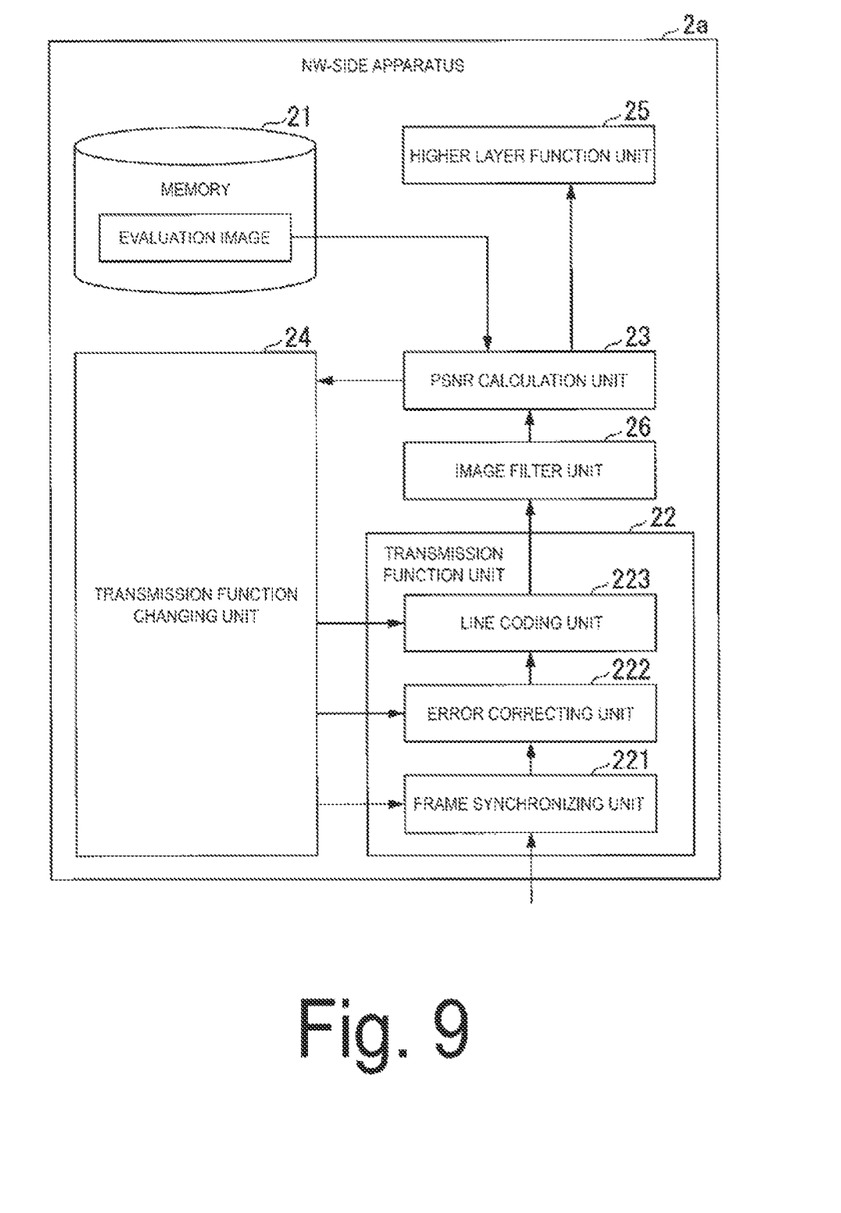
FIG. 9 is a block diagram illustrating a configuration of an NW-side apparatus according to a second embodiment.

FIG. 9 is a block diagram illustrating a configuration example of an NW-side apparatus 2a according to the present embodiment. The NW-side apparatus 2a illustrated in the drawing is different from the NW-side apparatus 2 of the first embodiment illustrated in FIG. 3 in that an image filter unit 26 is further provided. Before the PSNR calculation unit 23 calculates a PSNR, the image filter unit 26 removes noise of the image information on which the transmission function unit 22 has performed processing of the transmission functions. Thus, even in a case in which the performance of the transmission functions is low, a high PSNR can be obtained. In addition, the image filter unit 26 removes noise of the image information received from the user-side apparatus 3 before the image information is output to the higher layer function unit 25 for execution of the edge app.

The edge computing system according to the present embodiment can further reduce an amount of computation required for the transmission functions of the NW-side apparatus, compared with the first embodiment.

Third Embodiment

In the present embodiment, app processing is performed to provide a service to users on a cloud on a higher NW, rather than in an NW-side apparatus installed in an access station. Alternatively, the NW-side apparatus and the cloud may cooperate with each other to perform the app processing.

Figure 10:
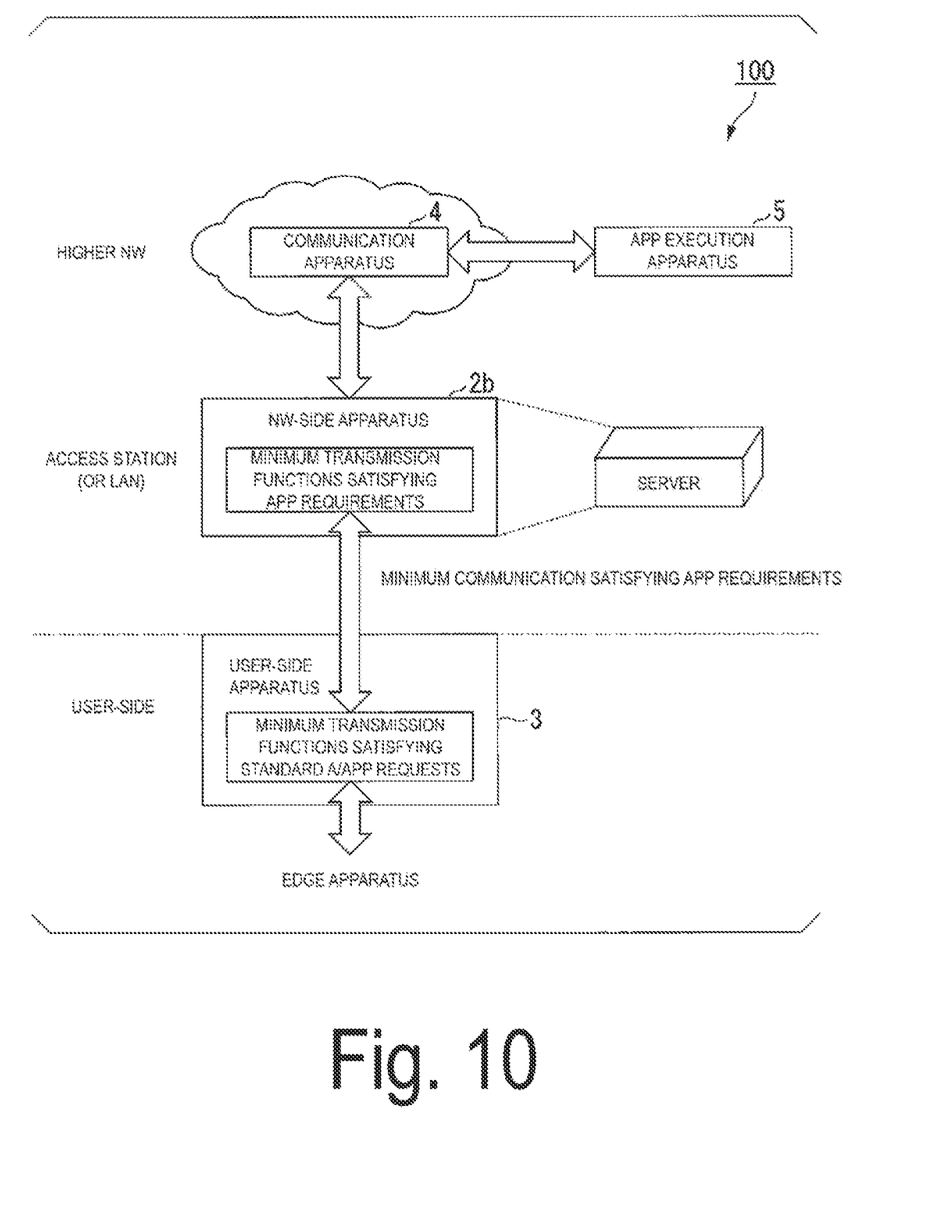
FIG. 10 is a configuration diagram of a cloud service providing system according to a third embodiment.

FIG. 10 is a configuration diagram of a cloud service providing system 100 according to the present embodiment. An NW-side apparatus 2b is connected to one or more user-side apparatuses 3. Although the NW-side apparatus 2b has a similar configuration to that of the NW-side apparatus 2 illustrated in FIG. 2 or the NW-side apparatus 2a illustrated in FIG. 8, the higher layer function unit 25 does not execute an application for a service to be provided to users. That is, the NW-side apparatus 2b, which is a simple apparatus such as a server having minimum transmission functions satisfying application requirements, is installed in an access station. Media data that has deteriorated through transmission between the user-side apparatus 3 and the access station-side apparatus is transmitted from the NW-side apparatus 2b to a communication apparatus 4 on a higher NW and then transmitted to an app execution apparatus 5. In addition, data output by causing the app execution apparatus 5 to execute the application for the service to be provided to the user is output to the user-side apparatus 3 via the communication apparatus 4 and the NW-side apparatus 2b. In this manner, the application for image and voice processing and the like is executed on the cloud.

According to the present embodiment, even in a case in which the app is executed on the cloud, the amount of computation required for the transmission functions of the NW-side apparatus of the access station can be reduced.

According to the embodiments described above, the same evaluation media data (e.g., evaluation image) are retained by both the user-side apparatus and the NW-side apparatus. The NW-side apparatus receives evaluation media data transmitted from the user-side apparatus, changes at least one of a frame search ratio, a degree of redundancy of error correction, and a line coding method so that the quality of the received media information (e.g., PSNR) at least meets the minimum quality required by the app of edge computing, and thereby reduces the transmission functions. As a result, edge computing can be achieved without using an NW-side dedicated apparatus that conforms to standards such as the PON. The NW-side apparatus can be achieved by a server because communication can be performed with minimum transmission functions satisfying requirements of the app and thus an amount of computation required for the NW-side apparatus can be reduced. In addition, this configuration can also be applied to an NW-side apparatus that transfers media information to the cloud.

Some or all of functions of the NW-side apparatuses 2, 2a, and 2b in the above-described embodiments may be implemented by a computer. In such a case, a program for implementing the functions may be recorded in a computer-readable recording medium, and a computer system may read and execute the program recorded in the recording medium. Note that the "computer system" mentioned herein includes an OS and hardware such as a peripheral apparatus. In addition, the "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. Further, the program may be for implementing some of the functions described above, and the functions described above may be implemented by a combination of the above-described functions and the program already recorded in the computer system.

According to the embodiments described above, the communication system includes the network-side apparatus and the user-side apparatus. Examples of the communication system include the edge computing system 1 and the cloud service providing system 100. The network-side apparatus includes the transmission function unit, the quality calculation unit, and the transmission function changing unit. The transmission function unit performs processing of the transmission functions on data received from the user-side apparatuses. The quality calculation unit calculates the quality of media data which is transmitted from the user-side apparatus and on which processing of the transmission functions is performed by the transmission function unit. For example, the media data is evaluation media data such as an evaluation image, and the quality calculation unit is the PSNR calculation unit 23. The transmission function changing unit changes the transmission functions performed by the transmission function unit so that the quality calculated by the quality calculation unit satisfies the minimum quality required by an application.

For example, the transmission function changing unit changes one or more of a frame search ratio, a degree of redundancy of error correction, and a line coding method.

Furthermore, the transmission function changing unit instructs the user-side apparatus to change the transmission functions in response to a change in the transmission functions of the transmission function unit. On the other hand, the user-side apparatus includes a transmission unit configured to perform processing of the transmission functions on media data and transmit the data to the network-side apparatus after access to the network-side apparatus is confirmed. In accordance with the instruction from the transmission function changing unit of the network-side apparatus, the transmission unit changes the transmission functions to be performed on data to be transmitted to the network-side apparatus.

The network-side apparatus repeats processing of causing the transmission function unit to perform processing of the transmission function on the media data received from the user-side apparatus, causing the quality calculation unit to calculate the quality of the media data, and causing the transmission function changing unit to reduce the transmission function within a range in which the quality calculated by the quality calculation unit satisfies a quality required by the application. In a case in which the transmission function changing unit finishes the change of reducing the transmission function with the repetition, the network-side apparatus notifies the user-side apparatus of the completion of the change in the transmission function and establishes communication with the user-side apparatus.

The network-side apparatus may further include a quality improvement processing unit configured to perform processing of improving the quality of data on which the transmission function unit performs processing of the transmission function. The quality calculation unit calculates a quality of media data on which processing of the transmission function is performed by the transmission function unit and on which the quality improvement processing is performed by the quality improvement processing unit.

Although the embodiments of the present invention have been described above in detail with reference to the drawings, specific configurations are not limited to those embodiments, and include any design or the like within the scope not departing from the gist of the present invention.

INDUSTRIAL APPLICABILITY

The present invention is applicable to an access system.

REFERENCE SIGNS LIST

1 Edge computing system
2, 2a, 2b NW-side apparatus
3 User-side apparatus
4 Communication apparatus
5 App execution apparatus
21 Memory
22 Transmission function unit
23 PSNR calculation unit
24 Transmission function changing unit
25 Higher layer function unit
221 Frame synchronizing unit
222 Error correcting unit
223 Line coding unit
26 Image filter unit
31 Memory
100 Cloud service providing system

The invention claimed is:

1. A communication system comprising:
a network-side apparatus; and
a user-side apparatus, wherein
the network-side apparatus includes:
a transmission function unit configured to perform processing of a frame search ratio, a degree of redundancy of error correction, and a line coding method on data received from the user-side apparatus;
a quality calculation unit configured to calculate a quality of media data which is transmitted from the user-side apparatus and on which the processing is performed by the transmission function unit,
wherein the quality is a peak signal to noise ratio (PSNR) calculated based on a first image and a second image obtained by imparting noise to the first image; and
wherein the transmission function changing unit is further configured to change the frame search ratio, the degree of redundancy of error correction, and the line coding method performed by the transmission function unit in a range in which the quality calculated by the quality calculation unit satisfies a quality required by an application.

2. The communication system according to claim 1, wherein
the network-side apparatus repeats processing of causing the transmission function unit to perform the frame search ratio, the degree of redundancy of error correction, and the line coding method on the data received from the user-side apparatus, causing the quality calculation unit to calculate the quality of the media data, and causing the transmission function changing unit to reduce the frame search ratio, the degree of redundancy of error correction, and the line coding method in the range in which the quality calculated by the quality calculation unit satisfies the quality required by the application, and
the transmission function changing unit notifies the network-side apparatus of completion of a change in the frame search ratio, the degree of redundancy of error correction, and the line coding method when the change of reducing the transmission function is finished.

3. The communication system according to claim 1, wherein
the network-side apparatus further includes a quality improvement processing unit configured to perform quality improvement processing of improving a quality of the data on which the processing of the frame search ratio, the degree of redundancy of error correction, and the line coding method is performed by the transmission function unit, and the quality calculation unit is configured to calculate the quality of the media data on which the processing of the frame search ratio, the degree of redundancy of error correction, and the line coding method is performed by the transmission function unit and on which the quality improvement processing is performed by the quality improvement processing unit.

4. The communication system according to claim 1, wherein
the transmission function changing unit does not change a function of the error correction for a header of a frame received from the user-side apparatus, and changes a function of the error correction for a payload part of the frame.

5. A network-side apparatus comprising:
a transmission function unit configured to perform processing of a frame search ratio, a degree of redundancy of error correction, and a line coding method on data received from a user-side apparatus;
a quality calculation unit configured to calculate a quality of media data which is transmitted from the user-side apparatus and on which the processing is performed by the transmission function unit,
wherein the quality is a peak signal to noise ratio (PSNR) calculated based on a first image and a second image obtained by imparting noise to the first image; and
a transmission function changing unit configured to change the frame search ratio, the degree of redundancy of error correction, and the line coding method in a range in which the quality calculated by the quality calculation unit satisfies a quality required by an application.

6. A transmission function changing method comprising:
performing processing of a frame search ratio, the degree of redundancy of error correction, and the line coding method on data received from a user-side apparatus;
calculating a quality of media data which is transmitted from the user-side apparatus and on which the processing is performed in the performing,
wherein the quality is a peak signal to noise ratio (PSNR) calculated based on a first image and a second image obtained by imparting noise to the first image; and
changing the frame search ratio, the degree of redundancy of error correction, and the line coding method performed in the performing in a range in which the quality calculated in the calculating satisfies a quality required by an application.

7. A non-transitory computer-readable medium having computer-executable instructions that, upon execution of the instructions by a processor of a computer, cause the computer to function as the network-side apparatus according to claim 5.

8. The communication system according to claim 1, wherein
the transmission function changing unit is further configured to change frame synchronization.

9. The communication system according to claim 1, wherein
the transmission function changing unit is further configured to change a physical layer function.

* * * * *